United States Patent

[11] 3,612,267

[72] Inventors: Werner Eckert; Heinrich Rothmann; Heinz Scheibe; Karl Beer, all of Munich, Germany
[21] Appl. No.: 19,287
[22] Filed: Mar. 13, 1970
[45] Patented: Oct. 12, 1971
[73] Assignee: Siemens Aktiengesellschaft, Berlin and Munich, Germany
[32] Priority: Mar. 18, 1969
[33] Germany
[31] P 19 13 680.2

[54] TESTING AND SORTING APPARATUS FOR RING-SHAPED ELEMENTS
24 Claims, 5 Drawing Figs.
[52] U.S. Cl. .................................................. 209/73, 209/81, 209/111.8, 324/34
[51] Int. Cl. .................................................. B07c 1/04
[50] Field of Search .................................... 209/111.8, 81, 81 M, 73; 324/34 MC

[56] References Cited
UNITED STATES PATENTS
3,539,004  11/1970  Baker et al. .................... 209/81 X
3,547,262  12/1970  Adsmond et al. ............... 209/81 X Primary Examiner—Richard A. Schacher
Attorney—Hill, Sherman, Meroni, Gross & Simpson ABSTRACT: Apparatus for measuring the electrical and/or magnetic properties of electrical constructional elements, particularly ferromagnetic ring cores, includes a guide for conveying the elements one at a time for testing. The guide includes a longitudinal slot having cross-sectional dimensions slightly greater than the diameter and thickness of an element to be tested and the guide is constructed of a material that is highly wear resistant, electrically insulating and possesses excellent sliding frictional properties. The guide is preferably constructed of a precious stone, such as sapphire, or from a hard or finely porous ceramic material. The guide is connected in a thick-disconnect manner to a supply container with the slot thereof in communication with a feed trough for the elements to be tested. The supply container is provided with a plurality of inner jets and internal sloping surfaces of the trough to present the elements one at a time into the slot of the guide. The guide includes a bore therethrough perpendicularly oriented with respect to the longitudinal dimension of the cross section of the slot to receive a test needle therethrough and through a ring core of the like positioned concentrically of the bore. The needle is mounted for reciprocation and includes a pair of electrical members insulated one from the other and contacting test apparatus upon each insertion action of the reciprocation. One member of the needle is of greater electrical capacity than the other in that it is to be included in a higher electrical loading circuit as a primary winding for the element under test while the other member is in a lesser electrical capacity in a secondary circuit for the test element.

INVENTORS
Werner Eckert, Heinrich Rothmann
Heinz Scheibe & Karl Beer

BY *[signature]* ATTYS.

INVENTORS
Werner Eckert, Heinrich Rothmann
Heinz Scheibe & Karl Beer

TESTING AND SORTING APPARATUS FOR RING-SHAPED ELEMENTS

BACKGROUND OF THE INVENTION

1. Field of the Invention

The invention relates to apparatus for the measuring of the electrical and/or magnetic properties of pierced electrical constructional elements, and more particularly for measuring the electrical and/or magnetic properties of ring cores and for the sorting of the ring cores.

2. Description of the Prior Art

Heretofore, in apparatus of this general type, it was known to convey and measure the properties of the electrical constructional elements one at a time. In the known apparatus the constructional elements to be measured and to be sorted in correspondence to their measured values are conveyed by a so-called vibrating conveyor to a position at which they are presented one at a time to an elongated vibrating feed. To this feed there is connected a short rigid guide the lower end of which forms the measuring position. The vibrating part and the rigid guide part are made of metal. The proper measurement of the electrical and/or magnetic properties of the electrical constructional elements is accomplished by a measuring device equipped with a measuring needle. The measuring needle is subdivided into two electrically conducting parts extending in the longitudinal direction of the measuring needle, which parts are insulated one from the other, for example, by an electrically insulating layer, and the parts are components of a primary and a secondary current circuit of the measuring device. In the measuring position, the measuring needle penetrates into the measuring zone of the guide and the pierced electrical constructional elements, for example, a ring-shaped storage core of ferrite material. The drive movement is a vibrating or oscillating movement about a pivot. The measured electrical constructional elements are sorted out by a sorting device which operates on the principle of a pneumatic switch and are guided in each case to corresponding receptacles.

The use of the vibrating conveyor requires that not only the conveyor, but also the feed, must necessarily be designed to vibrate. Since, however, the guide must be rigid at the position at which measuring occurs, a division of the guide into two parts is required. This division leads frequently to disturbances in the conveyance of the electrical constructional elements to be measured and sorted.

The use of metal, for example, eloxidized aluminum or chrome-nickel steel, as guide material also presents a number of difficulties. Metal used in the zone of the measuring position leads to falsifications of the test results and increases, in the leading of the measuring needle through the guide, the danger of an electrical short circuit. Ceramic materials, and particularly ferrite materials, have, moreover, as compared to metals, a great wearing-down effect. As a further disadvantage of this known device there proves to be the fact that the measuring needle oscillates about its bearing point such that the angle of the measuring needle axis is constantly changing which is highly undesirable for testing purposes.

It is therefore the problem and the object of the present invention to provide apparatus considerably improved over the aforementioned known measuring device, which apparatus is especially well suited for the conveyance of annular constructional elements of very small diameter and which has a high speed of conveyance.

SUMMARY OF THE INVENTION

Apparatus suited for the solution of the foregoing problem and for the fulfillment of the primary object of the invention and for the accurate testing of the electrical and/or magnetic properties of electrical constructional elements as generally noted above is, according to the invention, realized by the provision of a supply container with a slit-type opening arranged on its bottom part and having a feed trough inclined toward this opening and a set of air nozzles which, on air emergence, conveys the electrical constructional elements situated as bulk material in the supply container into the feed trough. A rigid, channel-type guide for the electrical constructional elements is connected to the outside of the slit-type opening of the supply container and a measuring needle is arranged in a zone near the end of the guide at a distance from the supply container. The measuring needle is subdivided in its longitudinal direction into two parts electrically insulated from one another and is mounted for reciprocation in its longitudinal direction for penetration of the guide and of an electrical constructional element within the guide. At penetration through the guide the measuring needle engages contacts to place the respective conductive parts thereof in individual circuits for measuring the properties of the elements. The apparatus also includes means for sorting the electrical constructional elements independence upon the properties ascertained by measuring.

This apparatus is well suited for the gentle and positionally accurate conveyance of more than 1,000 electrical constructional elements per minute. The connection between the supply container and the guide may be realized free of readjustment by means of a quick-connect-disconnect closure in which the entire guide can be positioned to the measuring point rapidly, interchangeably and reproduceably. For the adjustment of the position accuracy of the parts of the apparatus, for example of the supply container and of the guide, to one another, there is provided prestressed bow springs. The apparatus according to the invention makes possible, therefore, in each case of disturbance in the conveyance of the elements, a rapid separating of the individual construction groups and an inexpensive adjustment possibility by which it is absolutely free of play.

Advantageously, there is provided a set of swingable air nozzles through whose air jets the test elements are blown into the guide trough, and a stationary air nozzle through whose air jet the elements conducted upright in the feed trough are conveyed in the direction toward the slit-type opening of the supply container. Here, in the reversal position of the swingable air nozzles away from the fixed air nozzle, the air jet emerges from the stationary or fixed air nozzle in pulses.

In a further development of the object of the invention, the feed trough in the bottom of the supply container can be centrally arranged and has faced edges raised with respect to the surface of the bottom of the supply container.

As a remedy to possible clogging of the guide and of the feed trough in the zone of the position at where the elements are presented one at a time to the guide, and for loosening and freeing the constructional elements one from another in this zone, there is provided a further air nozzles whose pulse-form air jet is directed against the run-through direction of the elements with respect to the slit-type opening.

The pulse duration of the air jet amounts, for example, to 0.2 seconds and is expediently chosen in such a way that the repetition duration is shorter than the outflow time of the guide filled with elements, so that there does not take place any interruption of the continuity of the measuring process.

Advantageously, the rigid channel-type guide in the longitudinal direction is in one piece and the supply container is connected exclusively with the guide. This particular execution has the great advantage that the device operates, at least up to temperatures of about 60° C. altogether faultlessly, in its manner of operation, that is, it is not adversely affected by temperature-caused longitudinal expansions of the apparatus.

Expediently, the invention also provides that the guide is constructed as a cylinder with a longitudinal slit of rectangular cross section, the length of the cross section corresponding to about the outside diameter of a test element and the width of the cross section to about the height or thickness of the test elements, and that the guide has an opening or bore therethrough perpendicular to the longitudinal dimension of the cross section and at the lower end of the guide for serving for guiding and leading through of the end of the measuring needle.

The guide can advantageously be made of a precious stone, preferably sapphire, or possibly of a finely porous ceramic material. A guide of precious stone makes possible, in contradistinction to guides of metallic materials, a perfectly insulated guide or lead through for the measuring needle and has, moreover, excellent frictional sliding properties for the electrical constructional elements conducted through the guide. The guide of precious stone, because of the normally great hardness of the precious stone, is abrasionproof with respect to the constructional elements move therethrough, in which case there is additionally, unlike the situation with guides of metallic materials, the further advantage that the guide behaves electrically completely neutral with respect to the measuring of the magnetic and electrical values of the electrical constructional elements, for example, the switching or storage ring cores of ferromagnetic material. Sapphire as a material for the guide has, furthermore, only relatively slight tendency for electrostatic charging. For the extensive exclusion of electrical interferences of metal on the measuring point, the parts of the guide made of precious stone are additionally framed in a plastic support or casing.

The guide may be assembled, for example, of several strips in each case in one piece in their longitudinal direction. The invention provides, additionally, that the guide is interchangeable with a frame provided with a measuring standard, there serving as a measuring standard an electrical constructional element or ferromagnetic construction element, for example an annular storage core or switching core, of ferrite, defined in its electrical and/or magnetic values. Through the use of interchangeable measuring standards, it is possible to check various devices of the type of the invention with the same constructional element. Deviations from the measuring result of the various measuring positions among one another are hereby ascertainable for a short term, and for a long term can therefore be eliminated. The frame provided for the measuring standard, preferably of plastic, assures freedom from destruction of the constructional elements serving as a measuring standard.

The supply container in the guide are adjustable with respect to one another without effort under the action of the prestressed bow springs.

For increasing the useful life of the measuring needle, the needle cross section of the measuring needle part which is to be a component of the primary current circuit is provided stronger, that is thicker, than the measuring needle part that is to be a component of the secondary current circuit of the measuring apparatus, since the electrical load of the measuring needle is greater on the primary side. Through the design of the electrically conducting measuring needle parts as a contact bank and the dispensing with additional contact rivets, the transition resistances are reduced to a minimum.

Expediently, the part of the guide and of the sorting device positioned in the zone of the measuring point consist of a nonmetallic material, preferably of a precious stone of great hardness.

The back and forth movement of the measuring needle is accomplished through a play-free and wear-free drive by means of a spring parallelogram device in which there is provided as a drive element a control cam arranged about at the level of the measuring needle axis and having the characteristics of a 90° isosceles triangle.

BRIEF DESCRIPTION OF THE DRAWINGS

Other objects, features and advantages of the invention, its organization, construction and operation, will be readily apparent by reference to the following detailed description taken in conjunction with the accompanying drawings, in which.

DESCRIPTION OF THE PREFERRED EMBODIMENTS

Figure 1:
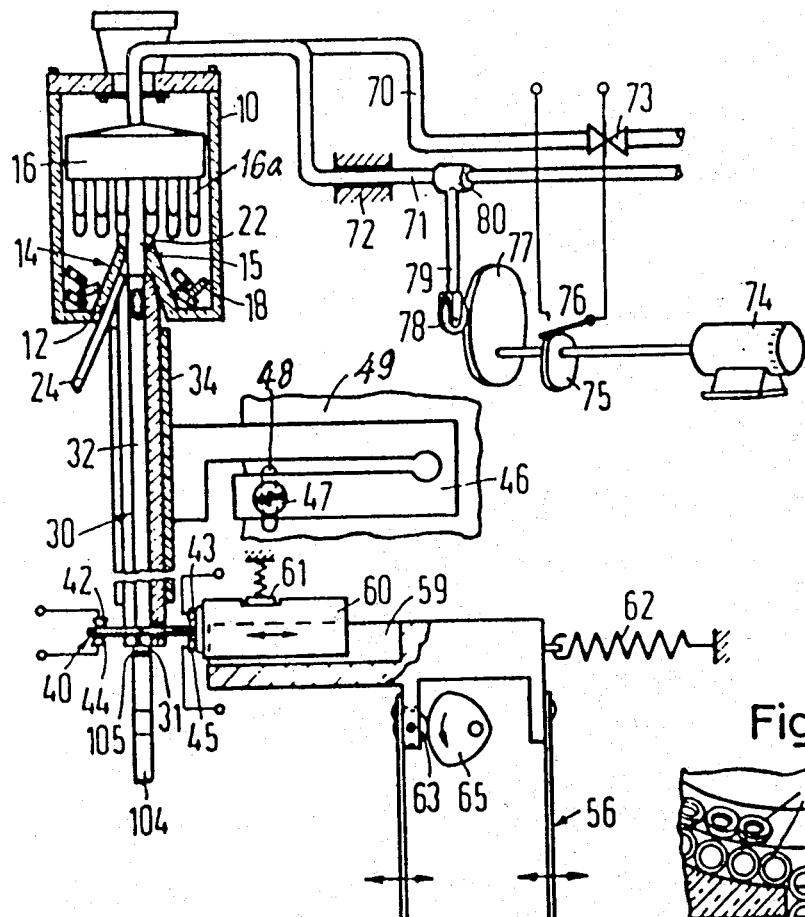
FIG. 1 illustrates apparatus for the measuring of the electrical and/or magnetic properties of electrical constructional elements in which only a portion of the sorting arrangement is indicated and the arrangement for the adjustment of the supply container and of the guide with respect to one another is omitted and wherein the guide and the supply are illustrated, partially in section, and in which the apparatus for reciprocating the measuring needle and the apparatus for feeding by fluid techniques the individual test elements are partially indicated in schematic form.
Figure 4:
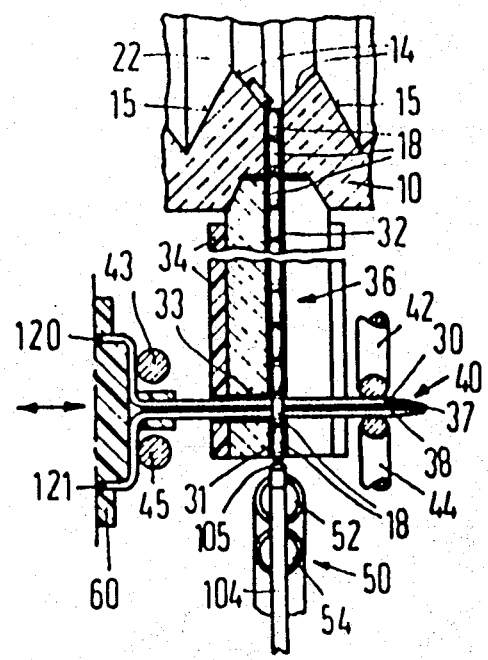
FIG. 4 illustrates in greater detail and in partial section the supply container, guide, measuring needle and sorting apparatus.

FIG. 1 illustrates a supply container 10 with a centrally arranged feed trough 14, the feed trough 14 being shown in greater detail in FIG. 4, disposed in the bottom part of the supply container 10. The supply container 10 consists of two parts connected with one another detachably in the plane of the feed trough so that in the case of fouling, clogging or the like of the feed trough the supply container may be easily dismantled. The feed trough 14 has side surfaces 15, 15 inclined in the direction toward the center of the supply container 10, which surfaces 15, 15 are beveled inwardly in the zone of their face edges 22 which are directed away from the bottom part of the supply container 10. In the bottom part of the supply container 10 there are accommodated electrical constructional elements, here annular ferrite cores 18, which under the action of an air nozzle set 16 and of an air nozzle 20 are blown into the feed trough 14 and in the direction toward a guide 30 coupled with the supply container 10. The air nozzle 20 is fixedly mounted in the supply container 10 in such a way that its air outlet is directed toward the outlet of the feed trough or channel 14. The air nozzle 16 consists of several, in the examples shown six, air nozzles 16a, which are swung in the direction of the double arrow A by a device represented schematically in FIG. 1, and blown through with air.

The just-mentioned device comprises an air line 71 swingably borne in a bearing 72 and connected to a source of air under pressure, such as a compressed air tank, not represented in the drawing. The air line 71 is set in a swinging motion by a swinging arm 79 connected to the line 71. As the swinging arm drive there is provided a motor 74 which is in driving engagement over a control concentric 77 with a roller 78 arranged on the end of the swinging arm 79. The air nozzle 20 is connected by way of an air line 70 to a source of air under pressure, possibly the same source as connected to the air line 71.

In the path of the air line 70 there is engaged a valve 73 for example a magnetic valve or a solenoid valve, which is actuable through a switch 76, which switch is operated in dependence on a control eccentric 75 coupled with the switch 76 in a pass or closed position. The control eccentric 75 is driven by the motor 74. The control eccentric 75 and 77 are dimensioned in such a way that the swing cycle of the swingable air nozzle set 16 amounts to about 1 to 2 seconds and the pulse duration of the air jet emerging in pulsations from the air nozzle 20 amounts to about 0.2 seconds. The air discharge from the air nozzle 20 takes place in the reversal position away from the air nozzle of the swingable air nozzle set 16.

The supply container 10 is connectable through a quick-connect-disconnect closure 90 with the guide 30. The closure 90 has a carrier plate 91, a support 92, locking bolts 93, 94 operable contrary to the action of springs 93a, 94a, respectively, and fitting pins 95 positioned in locator holes 96. The supply container 10 and the guide 30 are adjustable under the action of a prestressed bow spring 46 with respect to one another. The bow spring 46 is slidable in an oblong hole 48 in the stationary member 49 indicated in broken lines in FIG. 1, in the longitudinal direction of the guide 30 and fixable by a setting screw 47 in the desired vertical position.

The guide 30 is rigidly and without vibration connected to the supply container 10 and is constructed in one piece in its longitudinal direction. In the example of execution illustrated herein, the guide 30 is constructed as a cylinder with a longitudinal slot 32 having a rectangular cross section extending through the length of the guide. The length dimension of the cross section corresponds about to the outside diameter and the width of the cross section about to the height or thickness of the ring cores 18.

At the level of a measuring needle 40, which will be discussed below, the guide 30 has a bore 33 therethrough perpendicular to the long dimension of the rectangular cross section of the slot 32, which bore 33 serves for guiding the end of the measuring needle perpendicularly to the guide and through a core 18 to be tested. The guide 30 can be assembled out of several strips each of which strips are of one piece in their longitudinal direction and are bonded together, for example as by cementing. As material for the guide 30 there serves preferably a precious stone, in particular sapphire, which is distinguished by its excellent sliding properties for the ring cores 18, by its great abrasion resistance and by its electrical insulating properties. The guide 30 can also be formed of a finely porous ceramic material.

The guide 30 is framed in a nonmetallic support 34, which support is interrupted at least in the zone of the bore 33 of the guide 30 and at least in the zone of the longitudinal slot 32 of the guide 30. The support or casing 34 is preferably of plastic material.

For loosening up the bulk of the ring cores 18 at the position in which they are to be presented one at a time to the guide 30, and for the elimination of flow disturbances in this zone, there is provided an air nozzle 24 whose pulsating air jet blows against the run-through direction of the electrical ring cores 18 through a slit-type opening 12.

A prism 60 serves as a support for the measuring needle 40 and is guided under the action of a spring-operated element 61 on a prism guide 59. The prism guide 59 is part of a cam-controlled spring parallelogram drive 56, only schematically represented in the drawing, with two leaf springs 57, 58, and which is supported at 64 and spanned by a draw spring 62 in the direction away from the guide 30. A cam 65 in the shape of a right isosceles triangle, rotatably mounted, serves as the drive for the spring parallelogram drive 56. The cam rotates against a ball bearing 63 mounted on the prism guide 59 and is thereby connected in driving engagement with the measuring needle 40.

Figure 5:
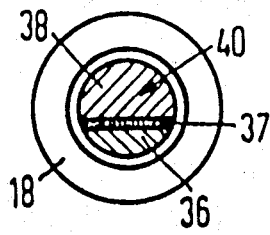
FIG. 5 illustrates on an enlarged scale a section through a measuring needle in the testing position having a ring core encircling the needle.
Figure 3:
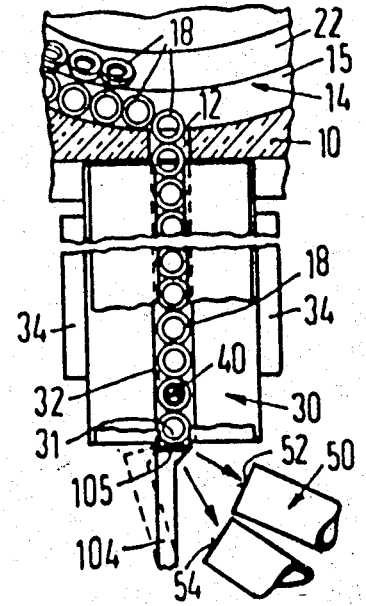
FIG. 3 illustrates the supply container, guide and sorting device of FIG. 1 in greater detail.

Attention is invited to FIG. 5, wherein it is illustrated that the measuring needle 40 is subdivided into two insulated measuring needle halves or parts 36, 38, which parts are electrically insulated from one another by an electrically insulating layer 37. The measuring needle 40 is coupled with a measuring device equipped with, among other things, a primary circuit and a secondary circuit. For the realization of an increased life of the measuring needle, the measuring needle parts 36, 38 have different cross sections, the cross sections of the measuring needle part 38 that is a component of the primary circuit being constructed thicker than the cross section of the measuring needle part 36 that is a component of the secondary current circuit, since the electrical load of the measuring needle is greater on the primary side. The electrically conducting measuring needle parts 36, 38 are constructed in each case as a contact bank 120, 121, whereby, and through the dispensing with additional contact rivets, the electrical transition resistances are reduced to a minimum. In the measuring position, that is in an extended penetration of the guide 30 and a ring core 18, the measuring needle parts 36, 38 come in electrically conducting contact with respective contacts 42, 43 and 44, 45.

The measuring apparatus engaged on the outside of the measuring needle 40 presents in the zone of the outlet opening 31 of the guide 30 a sorting device 50, which, in dependence on the determined electrical and/or magnetic values of the individual elements 18, sorts the elements. The sorting apparatus 50 has openings 52, 54, which openings are included as parts of a pneumatic system which is operated by the measuring device and by a magnetic or solenoid valve, and which convey the measured elements 18 into containers corresponding to their measured values. As a sorting device, there is also suited a member controllable through a piezoelectric converter, for example a fluidic element, in which the piezoelectric converter is controlled by the measuring device to operate the fluidic element.

Figure 2:
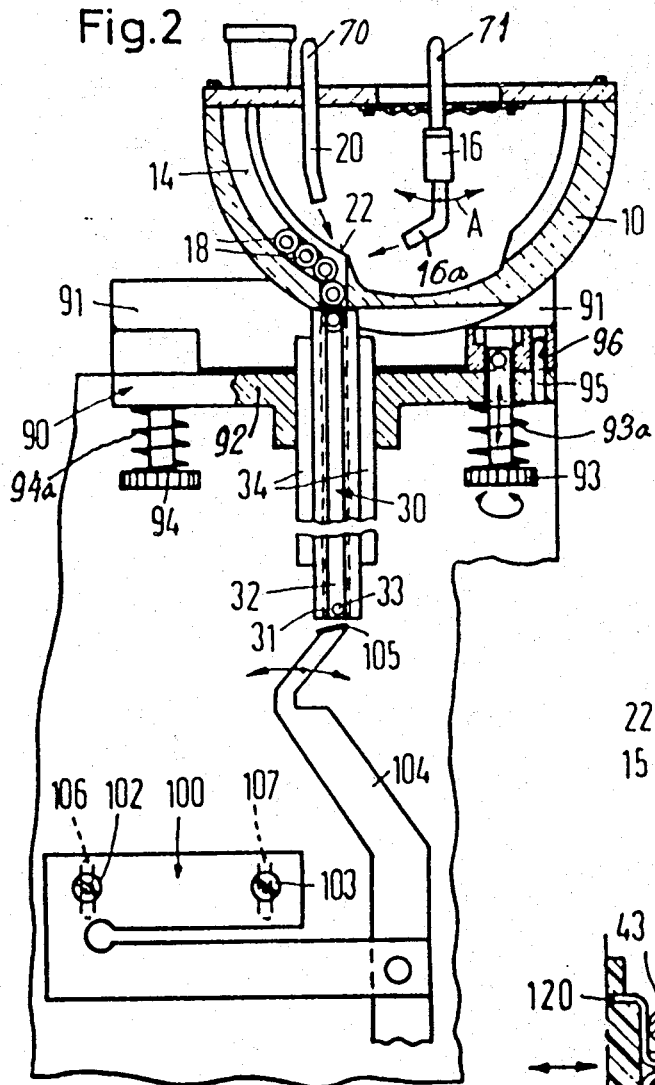
FIG. 2 illustrates the apparatus in FIG. 1, partially in schematic form, omitting the measuring needle and its drive apparatus for clarity and particularly illustrating the adjusting and sorting arrangements.

The discharge of the measured ring cores 18 from the guide 30 is regulated by a cam-controlled blocking hook 104, equipped on its free end with a sapphire member 105 and adapted in its swinging cycle to the measuring cycle of the measuring device. The blocking hook 104 is represented in partially broken form in FIG. 2. The adjustment of the blocking hook 104 is accomplished through the bow spring 100, which is slidable by means of longitudinal slits 106 relative to a frame 108 and is secured in position by screws 102, 103.

Generally then there has been disclosed apparatus for measuring properties of electrical elements, such as ring cores, in which the elements are stirred up and delivered to a guide on a one at a time basis by means of a pneumatic agitation system. The guide is formed of a cylinder having an elongate slot therethrough with a rectangular cross section to accommodate the corresponding cross section of the elements as viewed in their direction of travel therethrough. The guide is preferably of sapphire or a ceramic material of fine porosity such that it has excellent sliding properties, electrical insulation properties and great abrasion to resistance. The guide is provided with a transverse bore therein for receiving and guiding a reciprocating measuring needle which is connectable in a primary and a secondary circuit with respect to a core under test.

Many changes and modifications may be made in the invention by those skilled in the art without departing from the spirit and scope thereof, and it is to be understood that we wish to include within the patent warranted hereon all such changes and modifications as may reasonably and properly be included within the scope of the appended claims.

What we claim is:

1. Apparatus for measuring properties of ring-shaped elements, comprising: a supply container for holding a bulk supply of the ring-shaped elements, said container including a bottom having a feed opening therein, a feed trough inclined toward said feed opening and a plurality of air nozzles for urging the elements onto said feed trough for a one at a time exit through the feed opening; a rigid channel-type guide releasably secured to said supply container, said guide including a passageway extending the length thereof and positioned in communication at one end with the feed opening to guide said elements, and a bore therethrough transverse of and intersecting said passageway to define a measuring location; a measuring needle including a pair of conductive parts insulated one from the other; reciprocating means supporting said needle for insertion into and retraction from said bore and a ring-shaped element there located in correspondence with the feeding speed of the ring-shaped elements; contacts of an electrical measuring circuit for engagement with said parts of said needle upon insertion through said bore and a ring-shaped element; and a sorting device adjacent the other end of said guide for sorting the elements according to their measured properties.

2. Apparatus according to claim 1, wherein said plurality of air nozzles includes at least one swingingly mounted air nozzle for directing a sweeping flow of air to urge the elements onto said feed trough, and a fixedly mounted nozzle for directing airflow along said feed trough to urge the elements toward the feed opening.

3. Apparatus according to claim 2, comprising means for providing air pulsations from said fixedly mounted air nozzle as said swingingly mounted air nozzle moves away from the fixedly mounted nozzle.

4. Apparatus according to claim 1, wherein said feed trough is disposed centrally in said bottom of said container and includes face edges raised above the surface of said bottom.

5. Apparatus according to claim 1, wherein said plurality of air nozzles includes a fixedly mounted air nozzle for directing a pulse-form of airflow against the direction of travel of the elements along said feed trough.

6. Apparatus according to claim 1, wherein said rigid guide is formed of a single piece of material in its longitudinal direction.

7. Apparatus according to claim 6, wherein said rigid guide is cylindrical and said passageway is rectangular in cross section and has cross-sectional dimensions greater than the thickness and diameter of the ring-shaped elements, and said guide includes a longitudinal slot therein coextensively in communication with said passageway, said bore extending through said guide in communication with said passageway and said slot.

8. Apparatus according to claim 1, wherein said guide is made of precious stone.

9. Apparatus according to claim 1, wherein said guide is made of sapphire.

10. Apparatus according to claim 1, wherein said guide is made of a finely porous ceramic material.

11. Apparatus according to claim 1, wherein said guide includes a plurality of longitudinal strips secured together.

12. Apparatus according to claim 1, comprising a nonmetallic casing embracing said guide and interrupted at said bore and said longitudinal slit.

13. Apparatus according to claim 12, wherein said casing is formed of plastic.

14. Apparatus according to claim 1, comprising a frame having a measuring standard, said frame interchangeable with said guide.

15. Apparatus according to claim 14, wherein said measuring standard includes a ring-shaped element of known properties.

16. Apparatus according to claim 1, comprising adjustable spring means for adjusting said guide relative to said container.

17. Apparatus according to claim 1, wherein said container is connected exclusively with said guide.

18. Apparatus according to claim 1, wherein said supply container comprises two ports divided along and releasably secured along said feed trough.

19. Apparatus according to claim 1, wherein said parts of said measuring needle are of different cross section for inclusion in circuits of different current flow.

20. Apparatus according to claim 19, wherein said measuring needle parts are constructed as a contact bank.

21. Apparatus according to claim 1, wherein said guide includes precious stone in the area of the measuring location and in the areas of discharge to said sorting device at its said other end.

22. Apparatus according to claim 1, wherein said reciprocating means comprises a spring parallelogram device carrying said needle, and a rotating cam means to drive said spring parallelogram device.

23. Apparatus according to claim 22, wherein said cam means includes a cam having a 90° isosceles configuration.

24. Apparatus according to claim 1 comprising a piezoelectric converter operable by way of the electrical circuits which include said measuring needle, and said sorting device includes a fluidic member controlled by said converter for sorting the elements.